US005235462A

United States Patent [19]

Bidermann

[11] Patent Number: 5,235,462

[45] Date of Patent: Aug. 10, 1993

[54] DECORATED ARTICLE

[76] Inventor: Andreas Bidermann, Magenbuch 128, D-7965 Ostrach, Fed. Rep. of Germany

[21] Appl. No.: 730,908

[22] PCT Filed: Nov. 29, 1990

[86] PCT No.: PCT/DE90/00916

§ 371 Date: Jul. 30, 1991

§ 102(e) Date: Jul. 30, 1991

[87] PCT Pub. No.: WO91/08118

PCT Pub. Date: Jun. 13, 1991

[30] Foreign Application Priority Data

Nov. 30, 1989 [DE] Fed. Rep. of Germany ....... 3939519

[51] Int. Cl.5 ........................... G02B 5/28; G02B 1/10

[52] U.S. Cl. .................................. 359/580; 215/99.5; 359/582; 359/586

[58] Field of Search ....................... 359/580, 582, 586; 313/112; 215/99.5

[56] References Cited

U.S. PATENT DOCUMENTS 3,188,513 6/1965 Hansler .............................. 359/580
3,338,730 8/1967 Slade et al. .
3,490,250 1/1970 Jones .................................. 359/580
3,645,600 2/1971 Doctoroff et al. .
4,793,669 12/1988 Perilloux .
4,826,267 5/1989 Hall et al. .......................... 359/586
4,934,788 6/1990 Southwell .......................... 359/586
4,952,025 8/1990 Gunning, III ...................... 359/586

FOREIGN PATENT DOCUMENTS 0165021 12/1985 European Pat. Off. .
3635567 5/1987 Fed. Rep. of Germany .
8628629 9/1987 Fed. Rep. of Germany .
2121075 12/1983 United Kingdom .

OTHER PUBLICATIONS

H. A. M. Macleod "Thin Film Optical Devices", Academic Press, 1978y.

*Primary Examiner*—Martin Lerner
*Attorney, Agent, or Firm*—Spencer, Frank & Schneider

[57] ABSTRACT

In a decorative object with a transparent body, the formation of strong colored reflections is made possible by a certain shaping of the body in conjunction with an absorption-free interference coating system on areas of the surface. In addition, the disappearance of color depth or saturation under ordinary lighting conditions is prevented.

8 Claims, 5 Drawing Sheets

Number of layers: 3
Angle of incidence: 60°: 2 x transmission,
30°: 2 x reflection
Polarization angle: p:0° s:90° m:45°

| Layer No. | Refractive index | Coefficient of absorption | Layer thickness/nm |
|---|---|---|---|
| Environment | 1 | | |
| 1st layer | 2.3 | 0 | 326 |
| 2nd layer | 1.5 | 0 | 500 |
| 3rd layer | 2.3 | 0 | 326 |
| Substrate | 1.52 | 0 | |

DECORATED ARTICLE

BACKGROUND OF THE INVENTION

The invention relates to articles, the shape of which and the surface of which are designed in a specific manner to achieve an aesthetic effect.

The invention relates especially to a decorated article which exhibits a transparent body which has a specific shape and on the surface of which a layer system is provided to generate interference effects.

Technical applications for optical components are known and conventional. Examples are high-efficiency mirrors, filters and beam splitters. A survey is included in H.A.M. Macloed, Thin Film Optical Devices, in "Active and passive thin film devices", Academic Press 1978 (hereafter, reference D1)

A number of components may be produced only with the aid of interference layers. It is possible to cultivate virtually all physically non-forbidden optical properties with the aid of interference layer systems. The possibilities extend from complete dereflection to a mirror which reflects more strongly than a silver surface; from a narrow-band transmission filter to a band pass with steep edges. The dependence of the optical properties transmission T and reflection R upon the wavelength results in the fact that the layer system appears to be coloured. In particular, it is easy to achieve powerful, coloured reflection using interference layer systems; this is not possible or is possible only with difficulty when using other means.

Conventional dyeing takes place by addition of substances which absorb a specific wavelength range. The article then appears in the colour of the non-absorbed wavelengths. This mechanism takes place mainly upon the transmission of the light, scarcely at all in reflection. Absorbing coloration is characterised in that a part of the light is destroyed. An article coloured in this manner has a dark effect. The greater the purity and depth of the colour, the more light must be absorbed and the darker is the effect of the article. This effect makes itself disadvantageously noticeable especially in circumstances in which the colour is to be employed as a decorative element to achieve an aesthetic effect. The absorption is a property of the substances employed, so that the available colours are limited by the number of appropriate substances. Since what is involved is absorbing coloration, as a rule the mixing of various substances gives an impure mixed colour.

The application of absorption-free interference layer systems brings the following advantages:

production of any desired clear colours is possible,
powerful, coloured reflection,
bright colours, no loss of light.

Nevertheless, the absorption-free interference layer systems have not to date been used for decoration. It is to be assumed that the decisive factor concerning the non-use is the following: The colour effect of absorption-free interference layer systems shows a marked dependence upon the illumination conditions. In particular, it is harmful for an application that the colour effects almost disappear under usual, partly uniform illumination.

For explanatory purposes, the term "depth of colour" K will be used. Light of intensity I impinges upon the eye of the observer. The change in the intensity with the wavelength is of decisive importance to the colour perception. Maximum intensity Imax, and minimum intensity, Imin, occur within the visible range of the spectrum. The function K=(Imax-Imin)/Imin can be taken as a measure of the depth of colour, provided that the extreme values are not so close that the eye integrates with respect to the wavelength. In the event that the intensity does not fluctuate, Imax-Imin=0, the value 0 emerges for K. In fact, in this case the light appears white (colourless). The eye "measures" relatively, so that the ratio of intensities is computed in K. A large value of Imin reduces the value of K, so that it is taken into consideration that a basic intensity existing at all wavelengths "whitens" the colour.

Of the coloration of an article, the decoration of which consists in the coloration, it is to be required that the colours become effective under many illumination conditions.

1st case: pure reflection

In the case of pure reflection, layer systems and even single layers (lustres, soap bubbles) show great depth of colour. This is caused by a low value of Imin. It is not necessary to make any effort to achieve adequate depth of colour in reflection. However, pure reflection occurs very infrequently.

2nd case: pure transmission

In pure transmission, acceptable depth of colour can be achieved only with threefold layers (Table 1, below). It does not present any difficulty to achieve any selectably great depth of colour by design of the layer system. Pure transmission occurs more frequently than pure reflection. In most cases, it is sufficient to view a light source through the article. The brightness of a light source is, in comparison with the surroundings, frequently so great that to an approximation it is possible to refer to pure transmission.

3rd case: reflection and transmission at the same time.

In this case, the depth of colour is a function of the ratio of the causative intensities. FIG. 1 shows a typical illumination. A transparent article G, which exhibits an interference layer S, is situated above a base surface U (e.g.: the surface of a table) and is viewed obliquely from above (indicated by the eye symbol. FIG. 3 shows the quantities which are employed for the computation of the intensity impinging on the eye. The intensity is made up of intensity A incident from the left, multiplied by the transmission T, and the intensity B incident from the right, multiplied by the reflection R.

$$I = AT + BR,$$

$$T = (1 - R) \text{ for adsorption-free layer,}$$

$$\text{with } V = B/A \text{ and } A: = 1.$$

$$I = (1 - R) + VR$$

Table 2 (below) shows the depth of colour K as a function of V and R for the case concerning FIG. 1. The uncoated rear surface of the article is disregarded. The maximum reflection 60%, 81%, 93%, 96% corresponds to 3, 5, 7 and 9-fold layers (Table 1). It emerges from Table 2 that in the case of uniform illumination of the base surface (A=B or V=1) the depth of colour is precisely zero. This entire disappearance of the colour also occurs under real conditions; that is, irrespective of other light sources and illumination conditions in the room, as long as only the base surface is uniformly illuminated. Table 2 also shows the values of K for non-uniform illumination. The average value of K at differing values of V is a measure of the decorative effect under customary illumination conditions. It is of interest that the average value of K cannot be substantially increased by using a large number of layers.

The fact that the colour is weak under customary illumination conditions and can in some cases entirely disappear is a considerable defect which prevents the use of interference layers for the imparting of colour. Awareness of this defect forms part of the state of knowledge. Various proposals were made for the purpose of alleviating the defect:

European Patent Application, Appl. No.: 85304031.9, Publ. No.: 0 165 021 (hereafter reference D2) and DE-OS 3635567 (hereafter reference D3).

A symbol-generating optical interference device for authenticity verification is propose in reference D2. The danger that the interference colours are not visible is to be prevented in that entire layer systems are applied one on top of the other. In fact, the average depth of colour increases with an increasing number of layers (increasing maximum reflection) to some extent, see Table 2. However, a great expenditure is made for this purpose. The production expenditure increases excessively with the number of layers, because layer defects are additive. The gain in depth of colour is very small. Even with an arbitrarily large number of layers, the colour cannot be prevented from entirely disappearing under uniform illumination ($V=1$).

Reference D3 is based on the observation that even low depths of colour are sufficient for decoration if it is ensured that different colours are viewed at the same time. What takes place is an intensification of the contrast, and thus of the decorative effect, where two different colours are compared with one another; even where the respective depth of colour is very low. However, the specification according to reference D3 presumes a non-disappearing depth of colour. In the event of uniform illumination, all colours disappear, so that in the circumstances it is no longer possible to make any comparison of different colours. Furthermore, the excessively low depth of colour in the vicinity of $V=1$ can scarcely be alleviated by the specification according to reference D3.

SUMMARY OF THE INVENTION

The object of the invention is to provide an article which with the aid of a layer system and of a transparent body (1) exhibits the advantages of absorption-free coloration, in particular develops powerful colour reflections, permits any selectable colour choice and makes possible bright coloration without loss of light and (2) overcomes the defect of low or entirely disappearing depth of colour under customary illumination.

According to the invention, the object is achieved in that (a) the layer system comprises a sequence of at least three interference layers of varying refractive index, (b) the surface of the transparent body is designed so that surface regions are present, the surface normals to which differ in all three spatial components, (c) the layer system is disposed directly on the surface regions and (d) the transparent body is designed in such a manner that in the customary position of use of the body at least one coated surface region can be viewed through a second coated surface region.

DETAILED DESCRIPTION

The specification according to the invention sets in motion two independent physical mechanism. One mechanism attends to the creation of coloured reflections, and the second mechanism intensifies the depth of colour and also prevents the entire disappearance of the colour under customary illumination conditions.

The core of the invention is only accessible to experimental measurements or mathematical analysis. This is so because at first glance it cannot be understood how a layer which appears to be colourless then appears to be coloured when viewed through a second layer which likewise appears to be colourless.

Figure 1:
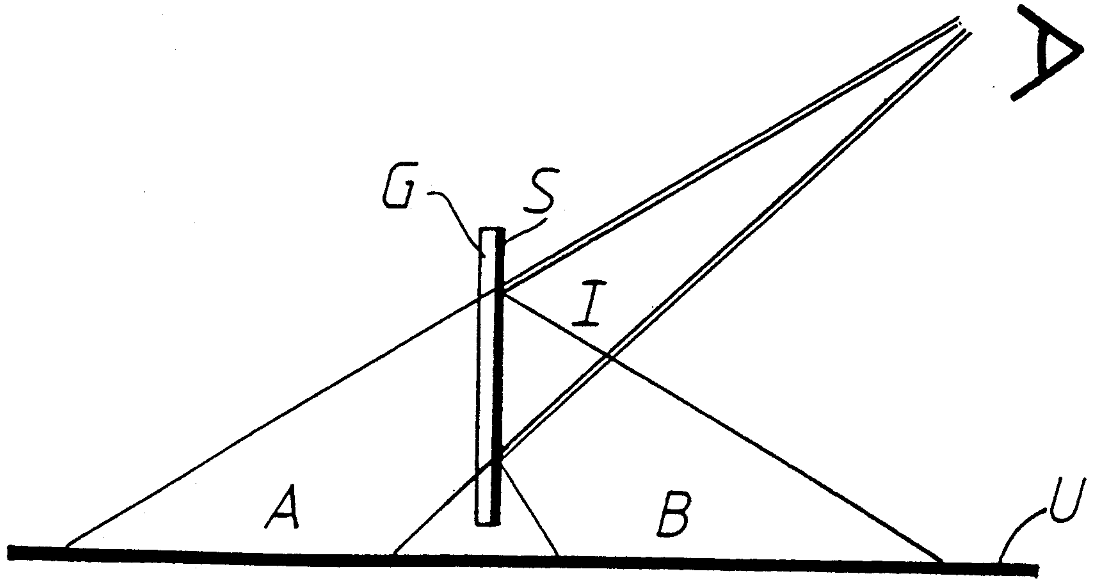
FIG. 1 is a side view schematically illustrating a flat article with an interference layer system, and light rays which reach the eye of an observer after impinging on the article.
Figure 2:
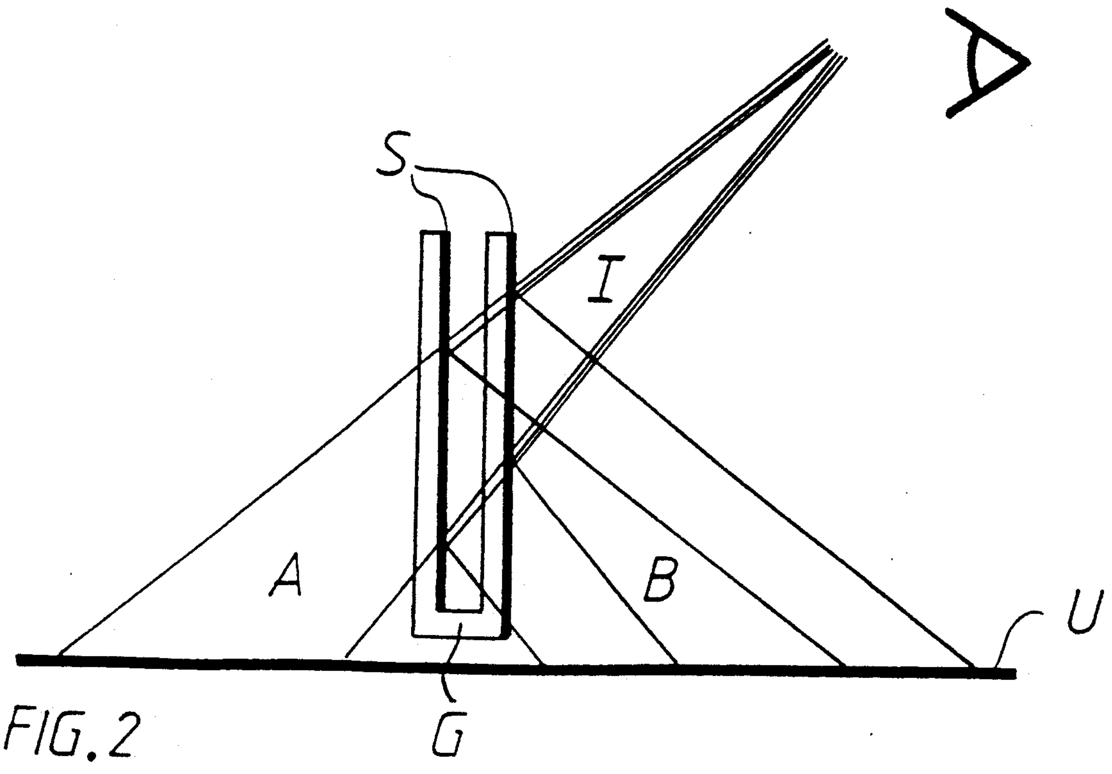
FIG. 2 is a side view schematically illustrating a U-shaped article with an interference layer system, and light rays which reach the eye of an observer after impinging on the article.
Figure 3:
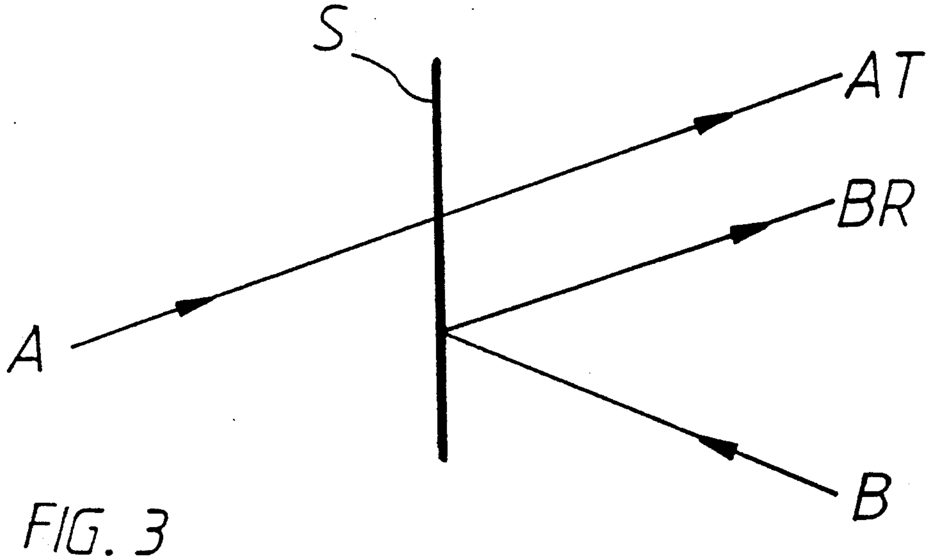
FIG. 3 schematically illustrates light rays which are reflected and transmitted by the interference layer system in FIG. 1.
Figure 4:
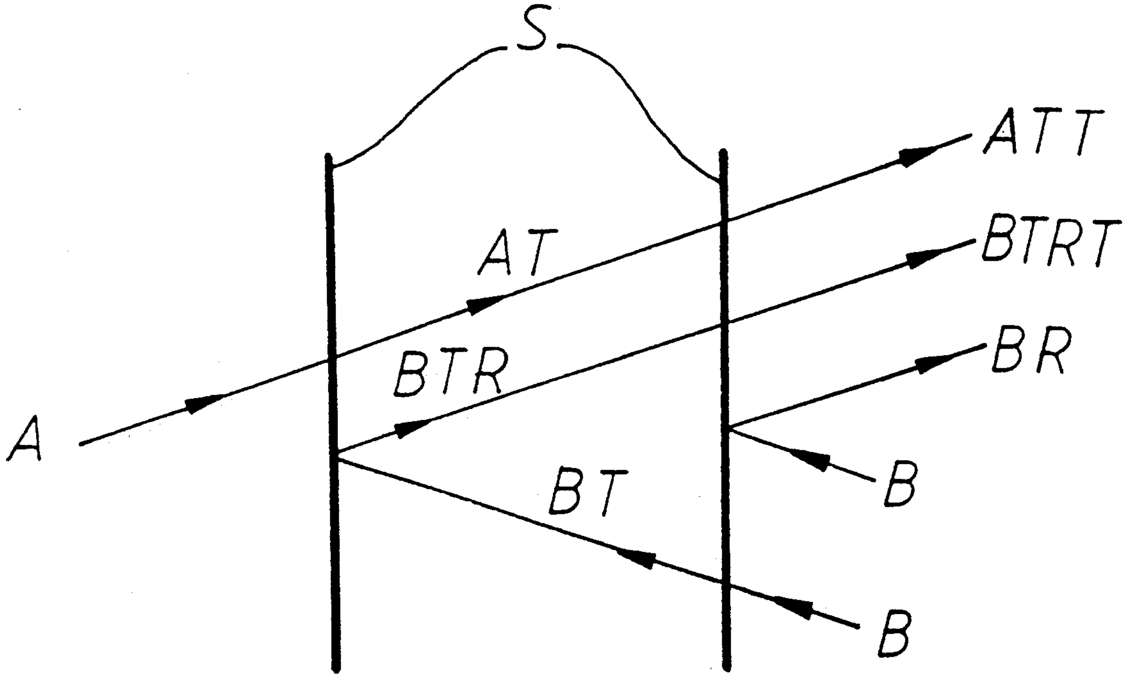
FIG. 4 schematically illustrates light rays which are reflected and transmitted by the interference layer system in FIG. 2.

In order to create the coloured reflections, it is necessary that the surface normals are varied in all three spatial components, and that a layer is viewed through another layer, while to intensify the depth of colour it is alone sufficient that one layer is viewed through the other layer Mechanism 1: Intensification of the depth of colour, prevention of disappearance of the colour under customary illumination FIG. 2 shows the case in which an article G is situated on a base surface U and is viewed obliquely from above. In contrast to FIG. 1 (previously discussed in the "Background of the Invention" section), according to the invention the article exhibits two coated surface regions. FIG. 4 indicates the quantities which are employed for the computation of the intensity. With T as transmission and R as reflection, the intensity is given as $$I = ATT + BTRT + BR$$

$$I = (1-R)^2 + V(R(1-R)^2 + R).$$

and consequently with $$T = (1-R) \text{ and } V = B/A$$

$$A := 1$$

It becomes clear that no value of V can be found for which the intensity I becomes independent of R. This means that according to the arrangement of FIG. 2 there is no illumination condition for which the colours of the arrangement disappear. Over and above this, Table 3 (below) shows that the depth of colour is on average intensified. For example, this depth of colour is even for a threefold layer (Rmax=60%) greater than for a ninefold layer (Rmax=96%) according to Table 2.

Mechanism 2: Creation of coloured reflections and illustrative embodiment

Figure 5:
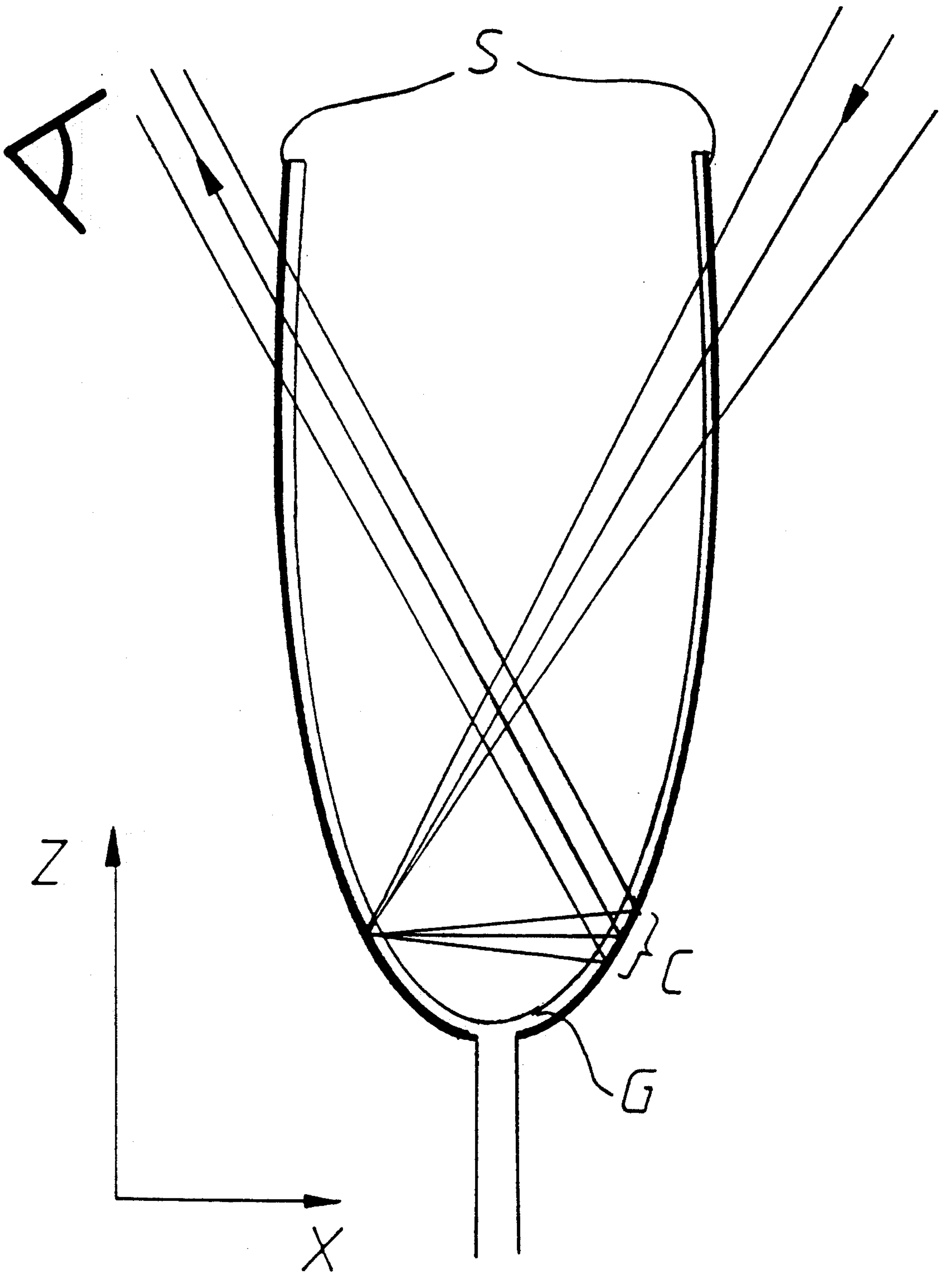
FIG. 5 is a sectional view schematically illustrating a champagne glass with an interference layer system, and light rays which reach the eye of an observer after impinging on the champagne glass.
Figure 6:
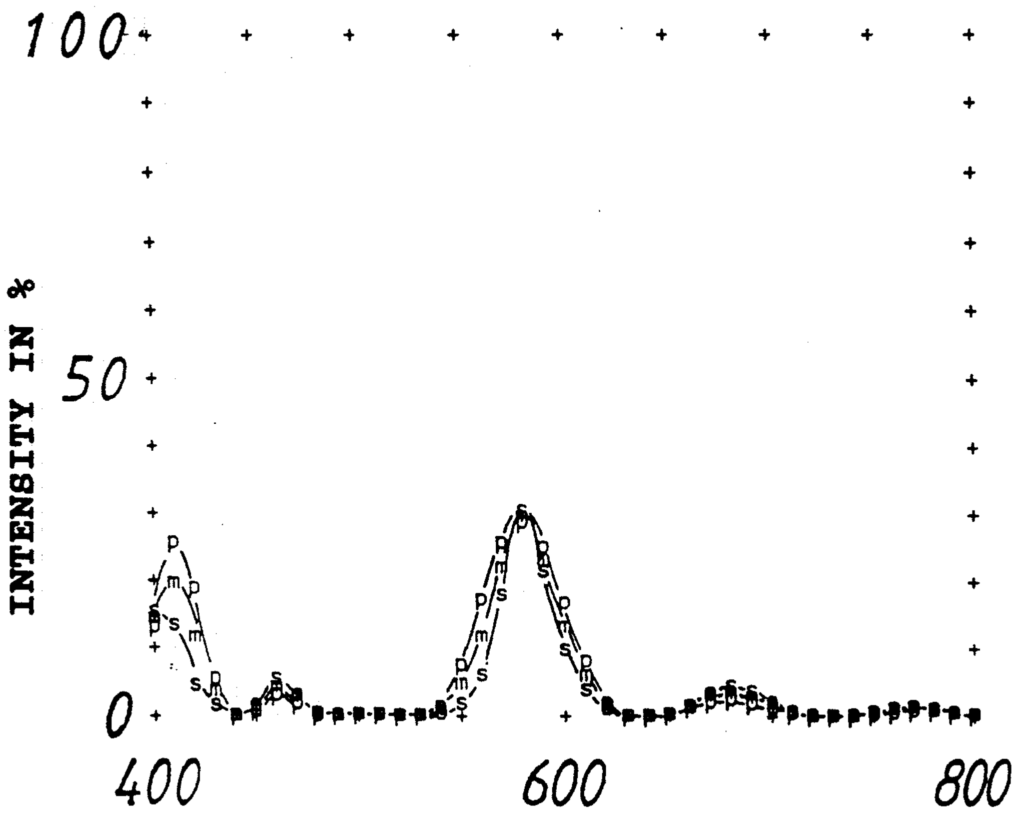
FIG. 6 is a graph showing the results of calculations made for second order reflection according to FIG. 5.

FIG. 5 shows an article G, for example a glass body with a curved surface (champagne glass), to the chalice walls of which a layer system S has been applied. An observer, indicated by the eye symbol, views the article obliquely from above. At the position C he views a reflection if a light source is also situated obliquely above. This is very easily possible by means of a lamp, a bright room ceiling, a window or by the sky. What is involved is a second order reflection which is made possible only in that the x and z components of the surface normals at various surface regions of the layer alter. For the relatively simple case of a second order reflection according to FIG. 5, a computation was made. The case concerned involves oblique light incidence, so that s and p components of the light must be taken into consideration. The beam path is situated only in one plane, so that s and p components do not become converted into one another, and it is sufficient to treat s and p components separately throughout the beam path. Specified data for the computation; threefold layer, transmission twice through the layer system at an angle of incidence of 60°, reflection twice at an angle of incidence of 30°, the uncoated substrate surfaces being disregarded. There are in existence mathematically favourably formulated representations of the interference effects in thin layers, for example, reference D1, pages 326--334, which can be utilised for the computation of the intensity. The results of the computation and the precise data on the layersystem are presented in FIG. 6. As is evident from FIG. 6, the invention permits 1. a considerable depth of colour, even for the simplest layer system and
2. a surprisingly high value for Imax.

The high value of Imax arises as a result of the use of the angle dependence of the optical properties of interference layer systems. If the optical properties were independent of the angle of incidence, then Imax=6.25% would emerge after transmission twice and reflection twice. The value of approximately 30% for Imax emerging from FIG. 6 relates to the intensity of the obliquely incident light. As a rule, the effect of the reflection is greater than the computed value permits to be assumed. For a reflection from a light source of high illumination density may be involved, or alternatively the light of an angular range is collected and concentrated onto the eye of the observer. Such concentration is indicated in FIG. 5 by three beam paths. The occurrence of the reflection is not tied to the specific geometry of FIG. 5. The reflection also occurs at other angles of incidence and angles of view. The angle of incidence and the angle of view do not need to be equally large. The reflection is then displaced in height on the glass. That is to say, there is frequently an entire reflection line under customary illumination.

Figure 7:
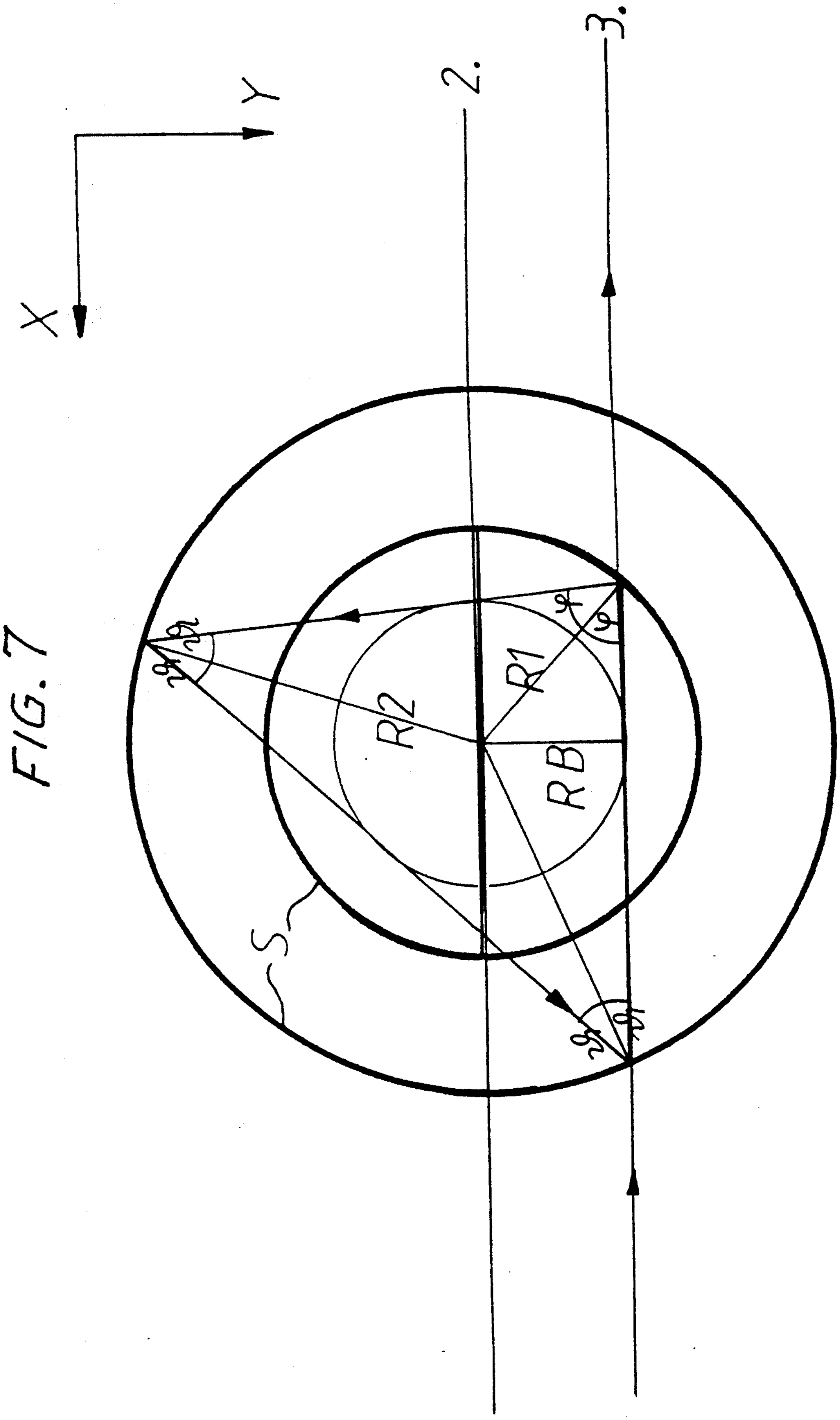
FIG. 7 schematically illustrates a top plan view of the champagne glass of FIG. 5, with supplementary lines added to facilitate discussion.

To date, consideration has been given to the second order reflection. However, according to the arrangement according to the invention reflections of higher order also occur. To view these, it is necessary to take into account all three spatial components of the beam path. The article shown in FIG. 5 is considered to be rotationally symmetric with respect to the z axis. In these circumstances, a representation according to FIG. 7 (top plan view) emerges for the x-y plane. In a similar way to FIG. 5, the incident beam is deflected in the lower part of the chalice. The radius of the chalice is small there, corresponding to R1 in FIG. 7. In the upper part, the chalice constantly has the radius R2. FIG. 7 shows a threefold reflection. It is characteristic that all rays within the chalice are tangent to a circle having the radius RB. The conditions $$1\phi+4\theta=180°,\ RB/R1=\sin\phi \text{ and } RB/R2=\sin\theta$$

give with precision a physically meaningful solution $$RB=-R2^2/4R1+\sqrt{(R2^2/4R1)^2+R2^2/2}.$$

That is to say, from the point of view of the observer, the third order reflection appears at a definite spacing from the second order reflection. If the causative light source does not have excessively large dimensions, the reflections are sharply separated from one another. Likewise, reflections of higher order are observed which are clearly separated from one another.

If the angle of incidence covers a whole range, then all orders form reflection lines.

The creation of these reflections is not trivial. Such creation requires the cooperation, according to the invention, of an interference layer system with a specific shaping. It is necessary for the surface normals in all three spatial components to vary. A transparent article of shape according to the invention can indeed form higher order reflections even without an interference layer. However, the intensity of these reflections is so low that observation is difficult and use for decoration of the article would be well nigh impossible.

The differences in the intensity are drastic. For example, the following values for the intensity of the second order reflection emerge for the beam path according to FIG. 5 in the absence of the interference layer system:

p-component: 0.0731% s-component: 0.250% computed in each case for a glass-air interface. Compared with the value of Imax from FIG. 6 amounting to approximately 30%, in this case the intensity is reduced to values which are in some cases far less than one hundredth. The difference permits the formulation that such reflections of higher order appear only as a result of the arrangement according to the invention.

The arrangement according to the invention is very suitable for the decoration of transparent articles. The reflections created generate the impression of being "highly sparkling" to an extent not known hitherto.

TABLE 1

| Layer system | Rmax in % | Rmin in % | Depth of colour K for transmission viewing |
|---|---|---|---|
| S H | 30.64 | 4.25 | 0.380 |
| S H N H | 61.18 | 4.25 | 1.466 |
| S H N H N H | 81.21 | 4.25 | 4.095 |
| S H N H N H N H | 91.53 | 4.25 | 10.304 |
| S H N H N H N H N H | 96.30 | 4.25 | 24.878 |

K = (Imax-Imin)/Imin = (Rmax-Rmin)/(1-Rmax) for transmission viewing
S: Substrate, refractive index 1.52, absorption-free
H: High-refraction lambda/4 layer, absorption-free, refractive index 2.3
N: Low-refraction lambda/4 layer, absorption-free, refractive index 1.5
normal light incidence
Rmax: maximum reflection (wavelength equal to lambda)
Rmin: minimum reflection (within the entire wavelength range)

TABLE 2

$I = (1 - R) + VR$ $K(Rmax) = (Imax - Imin)/Imin$ for $O < R < Rmax$

| R in % | V = 0.50 | V = 0.60 | V = 0.70 | V = 0.80 | V = 0.90 | V = 1.00 | V = 1.10 | V = 1.20 | V = 1.30 | V = 1.40 | |
|---|---|---|---|---|---|---|---|---|---|---|---|
| 0 | 100.00 | 100.00 | 100.00 | 100.00 | 100.00 | 100.00 | 100.00 | 100.00 | 100.00 | 100.00 | |
| 3 | 98.50 | 98.80 | 99.10 | 99.40 | 99.70 | 100.00 | 100.30 | 100.60 | 100.90 | 101.20 | |
| 6 | 97.00 | 97.60 | 98.20 | 98.80 | 99.40 | 100.00 | 100.60 | 101.20 | 101.80 | 102.40 | |
| 9 | 95.50 | 96.40 | 97.30 | 98.20 | 99.10 | 100.00 | 100.90 | 101.80 | 102.70 | 103.60 | |
| 12 | 94.00 | 95.20 | 96.40 | 97.60 | 98.80 | 100.00 | 101.20 | 102.40 | 103.60 | 104.80 | |
| 15 | 92.50 | 94.00 | 95.50 | 97.00 | 98.50 | 100.00 | 101.50 | 103.00 | 104.50 | 106.00 | |
| 18 | 91.00 | 92.80 | 94.60 | 96.40 | 98.20 | 100.00 | 101.80 | 103.60 | 105.40 | 107.20 | |
| 21 | 89.50 | 91.60 | 93.70 | 95.80 | 97.90 | 100.00 | 102.10 | 104.20 | 106.30 | 108.40 | |
| 24 | 88.00 | 90.40 | 92.80 | 95.20 | 97.60 | 100.00 | 102.40 | 104.80 | 107.20 | 109.60 | |
| 27 | 86.50 | 89.20 | 91.90 | 94.60 | 97.30 | 100.00 | 102.70 | 105.40 | 108.10 | 110.80 | |
| 30 | 85.00 | 88.00 | 91.00 | 94.00 | 97.00 | 100.00 | 103.00 | 106.00 | 109.00 | 112.00 | |
| 33 | 83.50 | 86.80 | 90.10 | 93.40 | 96.70 | 100.00 | 103.30 | 106.60 | 109.90 | 113.20 | |
| 36 | 82.00 | 85.60 | 89.20 | 92.80 | 96.40 | 100.00 | 103.60 | 107.20 | 110.80 | 114.40 | |
| 39 | 80.50 | 84.40 | 88.30 | 92.20 | 96.10 | 100.00 | 103.90 | 107.80 | 111.70 | 115.60 | |
| 42 | 79.00 | 83.20 | 87.40 | 91.60 | 95.80 | 100.00 | 104.20 | 108.40 | 112.60 | 116.80 | |
| 45 | 77.50 | 82.00 | 86.50 | 91.00 | 95.50 | 100.00 | 104.50 | 109.00 | 113.50 | 118.00 | |
| 48 | 76.00 | 80.80 | 85.60 | 90.40 | 95.20 | 100.00 | 104.80 | 109.60 | 114.40 | 119.20 | |
| 51 | 74.50 | 79.60 | 84.70 | 89.80 | 94.90 | 100.00 | 105.10 | 110.20 | 115.30 | 120.40 | |
| 54 | 73.00 | 78.40 | 83.80 | 89.20 | 94.60 | 100.00 | 105.40 | 110.80 | 116.20 | 121.60 | |
| 57 | 71.50 | 77.20 | 82.90 | 88.60 | 94.30 | 100.00 | 105.70 | 111.40 | 117.10 | 122.80 | |
| 60 | 70.00 | 76.00 | 82.00 | 88.00 | 94.00 | 100.00 | 106.00 | 112.00 | 118.00 | 124.00 | |
| 63 | 68.50 | 74.80 | 81.10 | 87.40 | 93.70 | 100.00 | 106.30 | 112.60 | 118.90 | 125.20 | |
| 66 | 67.00 | 73.60 | 80.20 | 86.80 | 93.40 | 100.00 | 106.60 | 113.20 | 119.80 | 126.40 | |
| 69 | 65.50 | 72.40 | 79.30 | 86.20 | 93.10 | 100.00 | 106.90 | 113.80 | 120.70 | 127.60 | |
| 72 | 64.00 | 71.20 | 78.40 | 85.60 | 92.80 | 100.00 | 107.20 | 114.40 | 121.60 | 128.80 | |
| 75 | 62.50 | 70.00 | 77.50 | 85.00 | 92.50 | 100.00 | 107.50 | 115.00 | 122.50 | 130.00 | |
| 78 | 61.00 | 68.80 | 76.60 | 84.40 | 92.20 | 100.00 | 107.80 | 115.60 | 123.40 | 131.20 | |
| 81 | 59.50 | 67.60 | 75.70 | 83.80 | 91.90 | 100.00 | 108.10 | 116.20 | 124.30 | 132.40 | |
| 84 | 58.00 | 66.40 | 74.80 | 83.20 | 91.60 | 100.00 | 108.40 | 116.80 | 125.20 | 133.60 | |
| 87 | 56.50 | 65.20 | 73.90 | 82.60 | 91.30 | 100.00 | 108.70 | 117.40 | 126.10 | 134.80 | |
| 90 | 55.00 | 64.00 | 73.00 | 82.00 | 91.00 | 100.00 | 109.00 | 118.00 | 127.00 | 136.00 | |
| 93 | 53.50 | 62.80 | 72.10 | 81.40 | 90.70 | 100.00 | 109.30 | 118.60 | 127.90 | 137.20 | |
| 96 | 52.00 | 61.60 | 71.20 | 80.80 | 90.40 | 100.00 | 109.60 | 119.20 | 128.80 | 138.40 | |
| 99 | 50.50 | 60.40 | 70.30 | 80.20 | 90.10 | 100.00 | 109.90 | 119.80 | 129.70 | 139.60 | Average K |
| K (60%) | 0.428 | 0.315 | 0.219 | 0.136 | 0.063 | 0.000 | 0.060 | 0.120 | 0.180 | 0.240 | 0.176 |
| K (81%) | 0.680 | 0.479 | 0.321 | 0.193 | 0.088 | 0.000 | 0.081 | 0.162 | 0.243 | 0.324 | 0.257 |
| K (93%) | 0.869 | 0.592 | 0.386 | 0.228 | 0.102 | 0.000 | 0.093 | 0.186 | 0.279 | 0.372 | 0.310 |
| K (96%) | 0.923 | 0.623 | 0.404 | 0.237 | 0.106 | 0.000 | 0.096 | 0.192 | 0.288 | 0.384 | 0.325 |

TABLE 3

$I = (1 - R)^2 + V(1 - R)^2 + R)$ $K(Rmax) = (Imax - Imin)/Imin$ for $O < R < Rmax$

| R in % | V = 0.50 | V = 0.60 | V = 0.70 | V = 0.80 | V = 0.90 | V = 1.00 | V = 1.10 | V = 1.20 | V = 1.30 | V = 1.40 |
|---|---|---|---|---|---|---|---|---|---|---|
| 0 | 100.00 | 100.00 | 100.00 | 100.00 | 100.00 | 100.00 | 100.00 | 100.00 | 100.00 | 100.00 |
| 3 | 97.00 | 97.58 | 98.16 | 98.74 | 99.33 | 99.91 | 100.49 | 101.07 | 101.65 | 102.24 |
| 6 | 94.01 | 95.14 | 96.27 | 97.40 | 98.53 | 99.66 | 100.79 | 101.92 | 103.05 | 104.18 |
| 9 | 91.03 | 92.68 | 94.32 | 95.97 | 97.61 | 99.26 | 100.90 | 102.55 | 104.19 | 105.84 |
| 12 | 88.08 | 90.21 | 92.34 | 94.47 | 96.60 | 98.73 | 100.86 | 102.99 | 105.12 | 107.24 |
| 15 | 85.16 | 87.75 | 90.33 | 92.92 | 95.50 | 98.08 | 100.67 | 103.25 | 105.83 | 108.42 |
| 18 | 82.29 | 85.30 | 88.31 | 91.32 | 94.33 | 97.34 | 100.35 | 103.36 | 106.37 | 109.38 |
| 21 | 79.46 | 82.87 | 86.28 | 89.69 | 93.10 | 96.51 | 99.92 | 103.33 | 106.74 | 110.15 |
| 24 | 76.69 | 80.47 | 84.26 | 88.04 | 91.83 | 95.62 | 99.40 | 103.19 | 106.98 | 110.76 |
| 27 | 73.98 | 78.12 | 82.26 | 86.40 | 90.53 | 94.67 | 98.81 | 102.95 | 107.09 | 111.23 |
| 30 | 71.35 | 75.82 | 80.29 | 84.76 | 89.23 | 93.70 | 98.17 | 102.64 | 107.11 | 111.58 |
| 33 | 68.79 | 73.57 | 78.35 | 83.14 | 87.92 | 92.70 | 97.48 | 102.26 | 107.04 | 111.82 |
| 36 | 66.33 | 71.40 | 76.48 | 81.55 | 86.63 | 91.70 | 96.78 | 101.85 | 106.92 | 112.00 |
| 39 | 63.96 | 69.31 | 74.66 | 80.01 | 85.37 | 90.72 | 96.07 | 101.42 | 106.77 | 112.12 |
| 42 | 61.70 | 67.31 | 72.93 | 78.54 | 84.15 | 89.76 | 95.38 | 100.99 | 106.60 | 112.22 |
| 45 | 59.55 | 65.41 | 71.27 | 77.14 | 83.00 | 88.86 | 94.72 | 100.58 | 106.44 | 112.30 |
| 48 | 57.52 | 63.62 | 69.72 | 75.82 | 81.92 | 88.01 | 94.11 | 100.21 | 106.31 | 112.41 |
| 51 | 55.63 | 61.95 | 68.28 | 74.60 | 80.93 | 87.25 | 93.57 | 99.90 | 106.22 | 112.55 |
| 54 | 53.87 | 60.41 | 66.95 | 73.50 | 80.04 | 86.58 | 93.12 | 99.67 | 106.21 | 112.75 |
| 57 | 52.25 | 59.01 | 65.76 | 72.52 | 79.27 | 86.02 | 92.78 | 99.53 | 106.29 | 113.04 |
| 60 | 50.80 | 57.76 | 64.72 | 71.68 | 78.64 | 85.60 | 92.56 | 99.52 | 106.48 | 113.44 |
| 63 | 49.50 | 56.66 | 63.82 | 70.98 | 78.15 | 85.31 | 92.47 | 99.63 | 106.80 | 113.96 |
| 66 | 48.37 | 55.73 | 63.10 | 70.46 | 77.82 | 85.18 | 92.55 | 99.91 | 107.27 | 114.64 |
| 69 | 47.42 | 54.98 | 62.55 | 70.11 | 77.67 | 85.24 | 92.80 | 100.36 | 107.93 | 115.49 |
| 72 | 46.66 | 54.42 | 62.19 | 69.95 | 77.72 | 85.48 | 93.24 | 101.01 | 108.77 | 116.54 |
| 75 | 46.09 | 54.06 | 62.03 | 70.00 | 77.96 | 85.93 | 93.90 | 101.87 | 109.84 | 117.81 |
| 78 | 45.72 | 53.90 | 62.08 | 70.26 | 78.43 | 86.61 | 94.79 | 102.97 | 111.14 | 119.32 |
| 81 | 45.57 | 53.96 | 62.35 | 70.74 | 79.14 | 87.53 | 95.92 | 104.31 | 112.71 | 121.10 |
| 84 | 45.63 | 54.25 | 62.86 | 71.48 | 80.09 | 88.71 | 97.32 | 105.94 | 114.55 | 123.17 |
| 87 | 45.92 | 54.77 | 63.61 | 72.46 | 81.31 | 90.16 | 99.00 | 107.85 | 116.70 | 125.54 |
| 90 | 46.45 | 55.54 | 64.63 | 73.72 | 82.81 | 91.90 | 100.99 | 110.08 | 119.17 | 128.26 |
| 93 | 47.21 | 56.56 | 65.90 | 75.25 | 84.60 | 93.94 | 103.29 | 112.63 | 121.98 | 131.32 |
| 96 | 48.23 | 57.85 | 67.46 | 77.08 | 86.69 | 96.31 | 105.92 | 115.54 | 125.15 | 134.77 |

TABLE 3-continued $I = (1 - R)^2 + V(1 - R)^2 + R)$ $K(Rmax) = (Imax - Imin)/Imin$ for $O < R < Rmax$

| R in % | V = 0.50 | V = 0.60 | V = 0.70 | V = 0.80 | V = 0.90 | V = 1.00 | V = 1.10 | V = 1.20 | V = 1.30 | V = 1.40 | |
|---|---|---|---|---|---|---|---|---|---|---|---|
| 99 | 49.51 | 59.41 | 69.31 | 79.21 | 89.11 | 99.01 | 108.92 | 118.72 | 128.72 | 138.62 | Average K |
| K (60%) | 0.968 | 0.731 | 0.545 | 0.395 | 0.271 | 0.168 | 0.090 | 0.038 | 0.071 | 0.134 | 0.341 |
| K (81%) | 1.194 | 0.855 | 0.612 | 0.429 | 0.287 | 0.173 | 0.091 | 0.048 | 0.127 | 0.211 | 0.402 |
| K (93%) | 1.194 | 0.855 | 0.612 | 0.429 | 0.287 | 0.173 | 0.116 | 0.131 | 0.219 | 0.313 | 0.433 |
| K (96%) | 1.194 | 0.855 | 0.612 | 0.429 | 0.287 | 0.173 | 0.145 | 0.161 | 0.251 | 0.347 | 0.445 |

I claim:

1. A decorated article, comprising:

a transparent body without an internal light source, the body having a customary position of use, the body additionally having a surface with surface regions that are oriented so that a first unit vector normal to a first one of the surface regions has X, Y, and Z components and a second unit vector normal to a second one of the surface regions has X, Y, and Z components that differ from those of the first unit vector for each of the X, Y, and Z components; and a layer system on the surface of the body and covering at least said first one of the surface regions and said second one of the surface regions, the layer system including a sequence of at lest three interference layers of varying refractive index, wherein the body is configured in such a manner that, in its customary position of use, at least a portion of the layer system covering said second one of the surface regions can be viewed through a portion of the layer system covering said first one of the surface regions.

2. A decorated article according to claim 1, wherein the layer system comprises a layer, the refractive index of which constantly varies in a direction normal to the surface of the body, which layer can be considered, to an approximation, as a sequence of at least three layers of varying refractive index.

3. A decorated article according to claim 2, wherein the layer system exhibits differing optical properties on different surface regions.

4. A decorated article according to claim 1, wherein the layer system exhibits differing optical properties on different surface regions.

5. A decorated article, comprising:

a light-permeable body without an internal light source, the body having a surface with surface regions that are oriented so that a first unit vector normal to a first one of the surface regions has X, Y, and Z components, a second unit vector normal to a second one of the surface regions has X, Y, and Z components that differ from those of the first unit vector for each of the X, Y, and Z components, and a third unit vector normal to a third one of the surface regions has X, Y, and Z components that differ from those of the first and second unit vectors for each of the X, Y, and Z components; and a layer system on the surface of the body and covering said first one of the surface regions, said second one of the surface regions, and said third one of the surface regions, the layer system including at least one interference layer;

wherein the body is configured in such a manner that a ray of light reflected from a portion of the layer system covering said third one of the surface regions and then reflected from a portion of the layer system covering said second one of the surface regions is visible through a portion of the layer system covering said first one of the surface regions.

6. A decorative article according to claim 5, wherein the layer system includes a sequence of at lest three interference layers of varying refractive index.

7. A decorative article according to claim 5, wherein the layer system comprises a layer, the refractive index of which constantly varies in a direction normal to the surface of the body, which layer can be considered, to an approximation, as a sequence of at lest three layers of varying refractive index.

8. A decorative article according to claim 5, wherein the body is a drinking vessel having a wall, and wherein said first one of the surface regions, said second one of the surface regions, and said third one of the surface regions are provided at spaced apart positions on the wall of the drinking vessel.

* * * * *